COMPOSITIONS,
COATING OR PLASTIC.

Patented July 6, 1937

2,085,793

UNITED STATES PATENT OFFICE 2,085,793

LIGHTWEIGHT MATERIAL AND METHOD OF MAKING THE SAME

Harold T. Coss, Somerville, N. J., assignor to Johns-Manville Corporation, New York, N. Y., a corporation of New York No Drawing. Application August 18, 1934, Serial No. 740,431

6 Claims. (Cl. 106—24)

This invention relates to a lightweight composition of matter suitable for use as thermal insulating or acoustical material. The invention relates particularly to the making of such lightweight material by a method which comprises applying a water-repellent material to void-containing particles of special type, mixing therewith an aqueous binder composition, and hardening the binder, and to the resulting product.

Conventional compositions including, for example, granules of calcined diatomaceous earth or other porous particles and Portland cement are important commercially. There has been needed, however, a composition of this type which, for a given overall density, is substantially stronger and more resistant to the effect of furnace temperatures.

It is an object of the present invention to supply a material meeting these requirements and a method of making the same. Other objects and advantages will appear from the description that follows.

The invention will be illustrated by reference to a thermal insulating composition comprising particles or granules containing voids of optimum size, a water-repellent material associated therewith, and a hydraulic binder of the type of calcium aluminate cement (Lumnite or cement fondu) adhering the granules and material associated therewith into a unitary product, with preservation of voids within the granules. The preferred embodiment of the product is monolithic.

In making the improved composition, particles provided with voids of optimum size are treated with a water-repellent material. An aqueous cementitious composition is mixed with the thus treated granules and the cementitious material therein is allowed to harden, whereby the particles are bonded into a unitary product with preservation of voids within the particles. To facilitate the mixing of the partially waterproofed granules, made as described, with the cementitious composition, a plasticizing or workability increasing agent of the type of bentonite is suitably used as an admixture in the cementitious composition.

First, there is provided a supply of heat-resistant void-containing granules. Thus, there may be made an aqueous mixture containing approximately two-thirds by weight of a binder of the type of kaolin, say, dry pulverized Georgia kaolin, and one-third by weight of heat destructible, removable filler, as, for example, fine oak sawdust of particle sizes adapted to pass through a screen having, for instance, 60 meshes to the linear inch. The mixture of kaolin, sawdust, and water is made plastic by the addition of water in proportion found necessary to give proper consistency for subsequent shaping. The plastic mixture is then formed into shapes such as briquettes, dried, and fired at a temperature adapted to develop a ceramic bond and to remove the filler initially incorporated. The temperature of firing may be approximately 2650° F., for instance.

After being fired, the units are cooled and formed into granules. The granulated material is screened and a fraction thereof is selected for further use. I have used to advantage a fraction of particle sizes largely between 4 and 65-mesh. Thus, grades that have been used satisfactorily showed the following screen test:

Screen test

| Size of particles | Per cent by weight |
|---|---|
| On 4-mesh screen | 0 to 2.5 |
| Through 4-mesh and on 65-mesh | 50 to 77.5 |
| Finer than 65-mesh | 50 to 20. |

Granules so made contain a multiplicity of closely spaced voids of the optimum size for the present purposes. These voids are of such size as to be barely visible to the eye without magnification and correspond to the spaces left in the material by the initial incorporation and subsequent destruction of the filler described.

A typical specimen of granules selected for use had an overall density of 48 pounds to the cubic foot. Because of their fired ceramic composition, they are strong and heat-resistant.

Granules prepared, for example, as described above, are next treated with a water-repellent material, suitably in the presence of an extender therefor, the extender being a volatile solvent or dispersion medium for the said material. Thus, there has been used an aqueous emulsion containing approximately equal proportions by weight of water and a relatively soft petroleum wax and, if desired, a small proportion also of an emulsion stabilizing agent, of which Montan wax is an example. The emulsion used contains the water-repellent material in very finely divided form.

By the term "water-repellent material", as used herein, is meant an agent that has negative capillarity for water and that reduces greatly or prevents entirely the absorption of liquid water into the voids in particles of the class described, without sealing the entrance to the said voids. Such water-repellent material is of the type of a wax or aluminum stearate that, when used in limited proportions, functions in the manner stated.

The waterproofing material may be diluted with a large volume of water, adapted to wet all the granules to which the material is to be mixed, and then applied to the granules. The actual water-repellent material is suitably used in limited proportion, to render the granules mostly not readily absorptive of water in large proportion although adapted to be wetted superficially, in localized areas at least, or to be readily mixed with an aqueous composition, such as the aqueous binder composition that will be described later. There may be used the petroleum wax composition in the proportion of 0.5 to 2.5 per cent of the wax itself on the dry weight of granules treated, the wax in the form of an emulsion being diluted, before application to the granules, with an amount of water that corresponds approximately to half the dry weight of granules to be treated.

After the waterproofing material has been allowed to contact thoroughly with granules, the resulting mixture is warmed to a moderately elevated temperature to remove the extender, which in this illustration of the invention is water. The elevated temperature is conveniently one adapted to volatilize the extender at a satisfactory rate. The temperature should be below that adapted to cause substantial loss of effectiveness of the water-repellent material. Thus, the temperature should not be so high as to cause substantial loss of the water-repellent material by evaporation or by dissipation, due to said material becoming so fluent as to disappear to a large extent within the interior of the granules. Using the wax described, I have used satisfactorily, for example, drying temperatures of 150 to 300° F. whereas a temperature of 500° F. has been found not to be satisfactory for best results.

The thus treated granules, in substantially dry condition, are next mixed with the aqueous binder composition. For this purpose I have used Lumnite cement in the proportion of approximately one part by weight of the cement to four parts of the granules, along with sufficient water to render the final mixture of proper consistency for casting. Even this low proportion of binder gives a satisfactorily strong although light product.

To facilitate the mixing of the granules with the acqueous cementitious composition and to serve as an agent to increase the plasticity or workability, I have used to advantage bentonite admixed into the cement, in the proportion of approximately one part by weight of the bentonite to seventy-five parts of the cement.

With such ratios of amounts of the solid materials to each other I have found that the proportion of water adapted to give the proper consistency for casting is only approximately 30 to 33 parts by weight to one hundred parts of total solid ingredients.

The mixture described is shaped promptly, as by being cast, and then allowed to harden, as by standing at ordinary temperature until the cement binder has set.

After the setting, say for 48 hours, the cast material may be dried, as at 212° F., to constant weight, for test purposes, or may be used without drying for thermal insulation.

Material so made has interesting properties. A typical product containing 75 parts by weight of the treated porous ceramic granules for 25 parts of Lumnite cement is adapted for use at temperatures as high 2500° F., without excessive shrinking, cracking or distortion. It has a strength that is very high in proportion to its density, having compressive strength of 475 to 616 pounds to the square inch, for specimens weighing approximately 66.7 to 68.2 pounds to the cubic foot. In comparable tests a composition made from the same type of granules and the same cement, in the same proportions, but with the omission of the water-repellent material, weighed 69.2 pounds to the cubic foot and had a compressive strength of only 290 pounds to the square inch.

The effect of the water-repellent material upon the proportion of water absorbed by the ceramic granules described is illustrated by the following comparative data:

*Absorption of liquid water by porous ceramic granules*

| Water-repellent wax used, percent on weight of granules | Water absorbed percent by weight of granules | | |
|---|---|---|---|
| | In 0.5 hour | In 3.5 hours | In 97.5 hours |
| 0.0 | 68.8 | 70.0 | 71.6 |
| 0.5 | 3.2 | 5.2 | 11.6 |
| 1.5 | 3.2 | 4.8 | 15.2 |
| 2.5 | 2.0 | 3.6 | 13.2 |

As the water-repellent material there may be used a water-repellent soap. I have found satisfactory results from the use of aluminum stearate.

The aluminum stearate is applied in small proportion, say, one part by weight to one hundred parts of the dry granules. The stearate is mixed in dry powdered form with the granules. The resulting mixture may then be warmed to a temperature of 250° F., to distribute the soap adequately over the granules. The thus treated granules are then mixed with Lumnite cement, bentonite and water, suitably in the proportions given, and the resulting mixture shaped and hardened, as described above.

A special effect is obtained when the particles are water-proofed with the dry aluminum stearate, for example. The final cast and subsequently hardened composition contains voids disposed between the granules and in the binder. These voids place pore spaces within the granules in communication, at intervals, with each other and with an outer surface of the article. These additional voids between the granules and within the binder are believed to be due to the entrapping of air, in the form of bubbles, as the composition is originally mixed and cast.

When the final product is intended for use at low temperatures, the Lumnite cement may be replaced by another suitable binder, as, for example, by a usual type of Portland cement or another hydraulic cementitious material.

In place of the bentonite, as plasticizer or workability-increasing agent, there may be used other materials of similar properties as, for example, a highly plastic clay.

It will be understood that the details given are for the purpose of illustration, not restriction, and that variations may be made within the scope of the appended claims.

What I claim is:

1. In making a composition of matter, the method which comprises providing void-containing particles, applying thereto a water-repellent material and a volatile extender therefor, subjecting the particles and associated water-repellent material to a moderately elevated temperature adapted to volatilize the extender but below that adapted to cause substantial loss of effectiveness of the water-repellent material, mixing the thus treated particles with an aqueous binder composition, and causing the binder therein to harden, whereby there is formed a unitary product with preservation of voids within the granules.

2. In making a lightweight composition of matter, the method which comprises providing void-containing particles, mixing therewith a composition of water-repellent material, subjecting the resulting mixture to a moderately elevated temperature adapted to volatilize water and below the temperature adapted to cause substantial loss of effectiveness of the water-repellent material, mixing the thus treated particles with water and a hydraulic cementitious composition, shaping the resulting mixture, and allowing the cementitious material therein to harden.

3. In making a lightweight composition of matter, the method which comprises providing void-containing particles, mixing therewith an aqueous emulsion containing water-repellent material of the type of petroleum wax, subjecting the resulting mixture to a moderately elevated temperature adapted to volatilize water and below the temperature adapted to cause substantial loss of effectiveness of the water-repellent material, mixing with the thus treated particles an aqueous binder composition, admixing therewith a small proportion of a plasticizing agent of the type of bentonite, to promote uniformity of mixing, shaping the resulting mixture, and allowing the binder therein to harden.

4. In making a lightweight composition of matter, the method which comprises providing void-containing particles, mixing therewith aluminum stearate in finely divided form, warming the resulting mixture to a moderately elevated temperature to cause distribution of the aluminum stearate over the said particles, forming a mixture including the thus treated particles, water and a hydraulic cementitious material, shaping the said mixture, and allowing the cementitious material therein to harden.

5. In making a lightweight composition of matter, the method which comprises forming a mixture of a clay composition, water, and finely divided heat-destructible filler material adapted to be passed through a screen having meshes of number of the order of sixty to the linear inch, drying and firing the mixture and granulating the product, whereby there are formed particles provided with voids resulting from the destruction of the filler of size stated, applying to the said particles a water-repellent material of the type of a substance selected from the group consisting of aluminum stearate and petroleum wax, in proportion not substantially in excess of 2.5 parts by weight to 100 parts of the granules, to render the granules mostly not readily absorptive of water in large proportion and to preserve their superficial wettability and ready mixability with an aqueous binder composition, drying the thus treated granules, mixing therewith the aqueous binder composition, shaping the resulting mixture and hardening the binder therein.

6. A composition of matter for use in making a lightweight monolithic refractory comprising water-wettable refractory porous ceramic granules constituting an aggregate, a limited proportion of water-repellent material coated over the said granules so that wettability of the granules by water is preserved and absorption of water thereinto is substantially prevented, and calcium aluminate cement intimately mixed with the coated granules.

HAROLD T. COSS.